(12) United States Patent
Sateesh

(10) Patent No.: US 9,066,071 B2
(45) Date of Patent: Jun. 23, 2015

(54) METHOD AND APPARATUS FOR PROVIDING SCREEN DATA

(71) Applicant: SAMSUNG ELECTRONICS CO., LTD., Suwon-si (KR)

(72) Inventor: Brhmadesam Sateesh, Noida (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/077,440

(22) Filed: Nov. 12, 2013

(65) Prior Publication Data

US 2014/0133773 A1 May 15, 2014

(30) Foreign Application Priority Data

Nov. 12, 2012 (IN) .......................... 4724/CHE/2012
Jul. 24, 2013 (KR) ....................... 10-2013-0087607

(51) Int. Cl.
*H04N 7/26* (2006.01)
*H04N 19/136* (2014.01)
*H04N 19/12* (2014.01)
*H04N 19/17* (2014.01)

(52) U.S. Cl.
CPC ......... *H04N 19/00139* (2013.01); *H04N 19/12* (2014.11); *H04N 19/136* (2014.11); *H04N 19/17* (2014.11)

(58) Field of Classification Search
CPC .................. H04N 19/00078; H04N 19/00139; H04N 19/00169; H04N 19/0026; H04N 19/12; H04N 19/136; H04N 19/17

USPC .................... 382/239; 375/240.24, E07.076; 709/203, 206, 204; 725/93, 116; 715/702, 733

See application file for complete search history.

(56) References Cited

U.S. PATENT DOCUMENTS

| | | | |
|---|---|---|---|
| 6,138,164 A * | 10/2000 | Kobata et al. | 709/231 |
| 6,523,063 B1 * | 2/2003 | Miller et al. | 709/206 |
| 6,704,452 B1 * | 3/2004 | Takeo | 382/233 |
| 8,224,099 B2 * | 7/2012 | Mitsuhashi et al. | 382/218 |
| 8,321,809 B2 * | 11/2012 | Eom | 715/792 |
| 2008/0082920 A1 * | 4/2008 | Eom | 715/702 |
| 2010/0030849 A1 * | 2/2010 | Miyamoto et al. | 709/203 |
| 2010/0054618 A1 * | 3/2010 | Kawazoe et al. | 382/239 |
| 2010/0199037 A1 | 8/2010 | Umbehocker et al. | |
| 2011/0138049 A1 | 6/2011 | Dawson et al. | |
| 2011/0209064 A1 | 8/2011 | Jorgensen et al. | |
| 2012/0079544 A1 * | 3/2012 | Massimino | 725/93 |
| 2012/0134420 A1 * | 5/2012 | Cho et al. | 375/240.24 |
| 2013/0039429 A1 * | 2/2013 | Hong | 375/240.24 |

OTHER PUBLICATIONS

"PCoIP technology," Teradici Corporation, pp. 1-3, 2013 (copyrighted), retrieved on Oct. 28, 2013.

* cited by examiner

*Primary Examiner* — Mekonen Bekele
(74) *Attorney, Agent, or Firm* — Sughrue Mion, PLLC

(57) ABSTRACT

The exemplary embodiments relate to providing screen data to a client, through a cloud server, and displaying the screen data in the client. The cloud server may encode the screen data in an encoding method that is independently determined according to attributes of each of a plurality of contents which form the screen data, and the client may decode the received screen data based on the encoding method in the cloud server and may display the decoded screen data. The screen data may be efficiently provided by performing encoding based on attributes of respective contents which form the screen data, compared to a case where only one encoding method is used.

24 Claims, 10 Drawing Sheets

FIG. 8
NEW ACTION COMES TO SHAKE THE WORLD!! — 820

METHOD AND APPARATUS FOR PROVIDING SCREEN DATA

RELATED APPLICATIONS

This application claims priority from India Patent Application No. 4724/CHE/2012, filed on Nov. 12, 2012, in the India Patent Office and Korean Patent Application No. 10-2013-0087607, filed on Jul. 24, 2013, in the Korean Intellectual Property Office, the disclosures of which are incorporated herein by reference, in their entirety.

BACKGROUND

1. Field

One or more exemplary embodiments relate to a method and apparatus for providing screen data. More particularly, the exemplary embodiments relate to a method and apparatus for providing screen data to a client through a cloud server in a virtual desktop infrastructure (VDI) environment.

2. Description of the Related Art

A virtual desktop infrastructure (VDI) may refer to a situation where a portion of or the whole resources, which are needed for a personal computer job, such as an application, a central processing unit (CPU), and a memory, are positioned in a server. The recent development of virtual desktop infrastructure is used to enable virtualization of a desktop computer. Furthermore, screen data may be transmitted in the process of virtualization of the desktop computer. In this case, screen data is generally transmitted after being encoded. However, as the size of the screen data increases, transmission costs increase even if the screen data is encoded. Furthermore, the transmitted screen data are generally composed of various contents having different attributes. However, the methods of the related art only processes the screen data according to a predetermined method, and thus accuracy is low and transmission costs are large.

SUMMARY

One or more exemplary embodiments include a method and apparatus for reducing transmission costs and enhancing accuracy in transmitting screen data.

Additional aspects will be set forth in part in the description which follows and, in part, will be apparent from the description, or may be learned by practice of the exemplary embodiments.

According to one or more exemplary embodiments, a method of providing, by a cloud server, screen data to a client includes: determining attributes of contents which form screen data to be displayed in the client; encoding the screen data according to the determined attributes of the contents; and transmitting to the client the encoded screen data and information related to the attributes of the contents which form the screen data.

The encoding may include determining an encoding method from among a plurality of predetermined encoding methods while focusing more on data loss reduction due to encoding than on an encoding speed increase as a ratio of text increases, as a result of the determination of the attributes of the contents.

The determining of the attributes of the contents may include determining the attributes of the contents using an API hooking scheme or by using a proprietary image processing scheme.

The method may further include classifying the screen data into one or more groups according to the determined attributes of the contents, wherein the encoding includes performing the encoding according to an encoding method which is independently determined for each group.

The classifying of the screen data into one or more groups may include classifying the screen data into one or more groups through extracting the contents based on the attributes of the contents which form the screen data.

The classifying of the screen data into one or more groups may include classifying the screen data into one or more groups through dividing an area based on the attributes of the contents which form the screen data.

The encoding may include determining a method of encoding a group, which is classified through the area division, based on a ratio of attributes of contents which exist in the group, when a plurality of content attributes exist within the group.

According to one or more exemplary embodiments, a method of displaying screen data by a client may include: receiving from a cloud server screen data and information related to attributes of contents which form the screen data; decoding the screen data based on the received information related to the attributes of contents; and displaying the decoded screen data.

The decoding may include determining a decoding method from among a plurality of predetermined decoding methods while focusing more on data loss reduction due to decoding than on a decoding speed increase as a ratio of text increases based on the received information related to the attributes of the contents.

An aspect of the exemplary embodiments may provide a cloud server for providing screen data to a client, the cloud server including: a determiner configured to determine attributes related to contents which form screen data to be displayed in the client; a classifier configured to classify the screen data into one or more groups according to the attributes of the contents which are determined by the determiner; and an encoder configured to encode the screen data according to the determined attributes related to the contents.

The cloud server may further include a transmitter configured to transmit to the client the encoded screen data and information related to the attributes of the contents which form the screen data.

The encoder may be configured to determine a method of encoding from among a plurality of predetermined encoding methods while focusing more on data loss reduction due to encoding than on an encoding speed increase as a ratio of text increases, as a result of the determination of the determiner.

The determiner may be configured to determine the attributes of the contents using an API hooking scheme or a proprietary image processing scheme.

The cloud server may further include: a classifier configured to classify the screen data into one or more groups according to the determined attributes of the contents, wherein the encoder is configured to perform the encoding according to an encoding method which is independently determined for each group.

BRIEF DESCRIPTION OF THE DRAWINGS

These and/or other aspects will become apparent and more readily appreciated from the following description of the exemplary embodiments, taken in conjunction with the accompanying drawings in which:

FIG. 8 are images of an example where some contents are extracted from screen data, according to an exemplary embodiment;

DETAILED DESCRIPTION OF THE EXEMPLARY EMBODIMENTS

Figure 1:
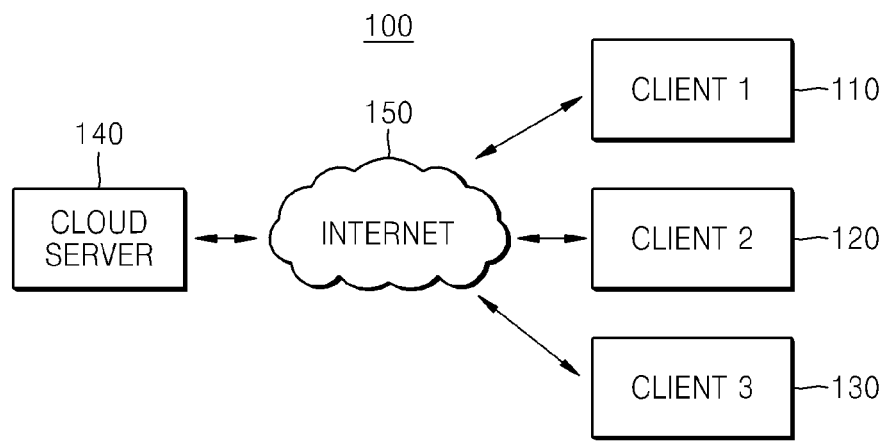
FIG. 1 is a diagram of an example where a cloud server is connected to the clients via the Internet, according to an exemplary embodiment.

Reference will now be made in detail to the exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Terms such as "first" and "second" may be used to describe various components in the present specification, but the components are not limited by the terms. The terms may be used to distinguish one component from another component.

Furthermore, a singular expression in the specification may include a plural expression unless clearly stated otherwise.

In the description below, the description related to already known technologies regarding the features of the exemplary embodiments will be omitted. The exemplary embodiments described below are the detailed description to help with a comprehensive understanding of the exemplary embodiments. However, the exemplary embodiments do not limit the scope of rights of the present invention.

In the exemplary embodiments, terms such as "communication,", "communication network," and "network" may refer to the same thing. The three terms may refer to wireless or wired local or wide area network data transmission and reception networks through which files may be transmitted and received between a user terminal, terminals of other users, and download servers.

In the exemplary embodiments, a virtual desktop infrastructure (VDI) may refer to a situation where a portion of or the whole resources, which are needed for a personal computer job, such as an application, a central processing unit (CPU), and a memory, are positioned in a server.

Furthermore, in the exemplary embodiments, a cloud may refer to an infrastructure which is hidden in a network.

Furthermore, in the exemplary embodiments, a server may refer to a cloud server 140. The cloud server 140 may be a server in charge of cloud computing.

Furthermore, a client 110, 120, or 130 may refer to a smartphone, a mobile phone, a personal digital assistant (PDA), a laptop computer, a media player, a global positioning system (GPS), and other mobile or non-mobile computing devices. However, the exemplary embodiments are not limited thereto, and the client 110, 120, or 130 may include all devices which provide a display screen.

Some examples of a cloud network are a local area network (LAN), a wide area network (WAN), and a wireless network, but are not limited thereto.

Furthermore, a computer-readable recording medium may be understood as a medium which participates in providing data for a device to perform a certain function. Various readable recording media may be used in an exemplary embodiment where a server device is implemented. A readable recording medium includes a volatile or non-volatile recording medium. Some examples of the recording medium are a floppy disk, a magnetic tape, a hard disk drive, another type of magnetic medium, a CD-ROM, an optical storage medium, PROM, EPROM, and a memory chip. The recording medium may be tangible so that a command transmitted by the medium may be searched for according to a physical method.

In another exemplary embodiment, the computer-readable recording medium may be a transmission medium including a bus 1240. The transmission medium may include an optical cable, a copper wire and an optical fiber. The transmission medium may be a medium which is used in communication, such as an electric wave or infrared communication.

Hereinafter, one or more exemplary embodiments will be described with reference to the attached drawings.

FIG. 1 is a diagram of an example where the cloud server 140 and the clients 110 to 130 are connected via the Internet 150, according to an exemplary embodiment.

One cloud server 140 may be connected to one or more clients 110 to 130 via the Internet 150. The cloud server 140 may be a server in charge of cloud computing. The cloud computing may be a computing environment where information technology (IT)-related services such as storing data, a network, and use of contents may be used all together.

The computing environment may include a plurality of clients 110 to 130. For example, some examples of the client which forms the computing environment may include client 1 (110), client 2 (120), and client 3 (130). Furthermore, the computing environment may include the cloud server 140, which is connected to e clients 110 to 130 on a network.

The clients 110 to 130 may be connected to the cloud server 140 through the Internet 150. Furthermore, the clients 110 to 130 may have an access to screen data which are provided from the cloud server 140. The Internet 150 may be a cloud network.

The cloud server 140 or the clients 110 to 130 may select a method of analyzing screen data. That is, the clients 110 to 130 may select one of a plurality of methods of analyzing screen data. Furthermore, the clients 110 to 130 may select one of the methods of analyzing screen data based on a user selection. For example, the method of analyzing screen data may be a windows-based analysis or may be an image-processing-based analysis.

When the window-based analysis method is selected, the cloud server 140 or the clients 110 to 130 may analyze screen data in a temporally efficient manner.

when the window-based analysis method is selected, the user may have access to screen data which is based on graphics device interface (GDI) calls. The window-based analysis method may analyze screen data in a temporally efficient manner.

When the analysis method based on the image processing is selected, the cloud server 140 or the clients 110 to 130 may analyze attributes of contents, which are related to the screen data.

When the analysis method based on the image processing is selected, the cloud server 140 or the clients 110 to 130 may process the screen data by capturing and processing the screen data.

The cloud server 140 may capture the screen data, store the captured screen data, and analyze the captured screen data.

The analysis of the screen data may be performed in the cloud server 140, as well as being performed in clients 110 to 130.

The attributes of contents or data related to the screen data may be retrieved. The search may include detecting attributes of data. Furthermore, the cloud server 140 or the clients 110 to 130 may separate the attributes of data from the contents which form the screen data.

In order for the clients 110 to 130 to display the screen data, the decoding operation may be needed with respect to a plurality of pieces of data which form the screen data, and with respect to attributes of the contents.

The selection of the screen data analysis method is possible Thus, the cloud server 140 or the clients 110 to 130 may analyze the screen data in a very efficient manner in consideration of the resultant accuracy and processing time, which are required in processing the screen data.

Figure 2:
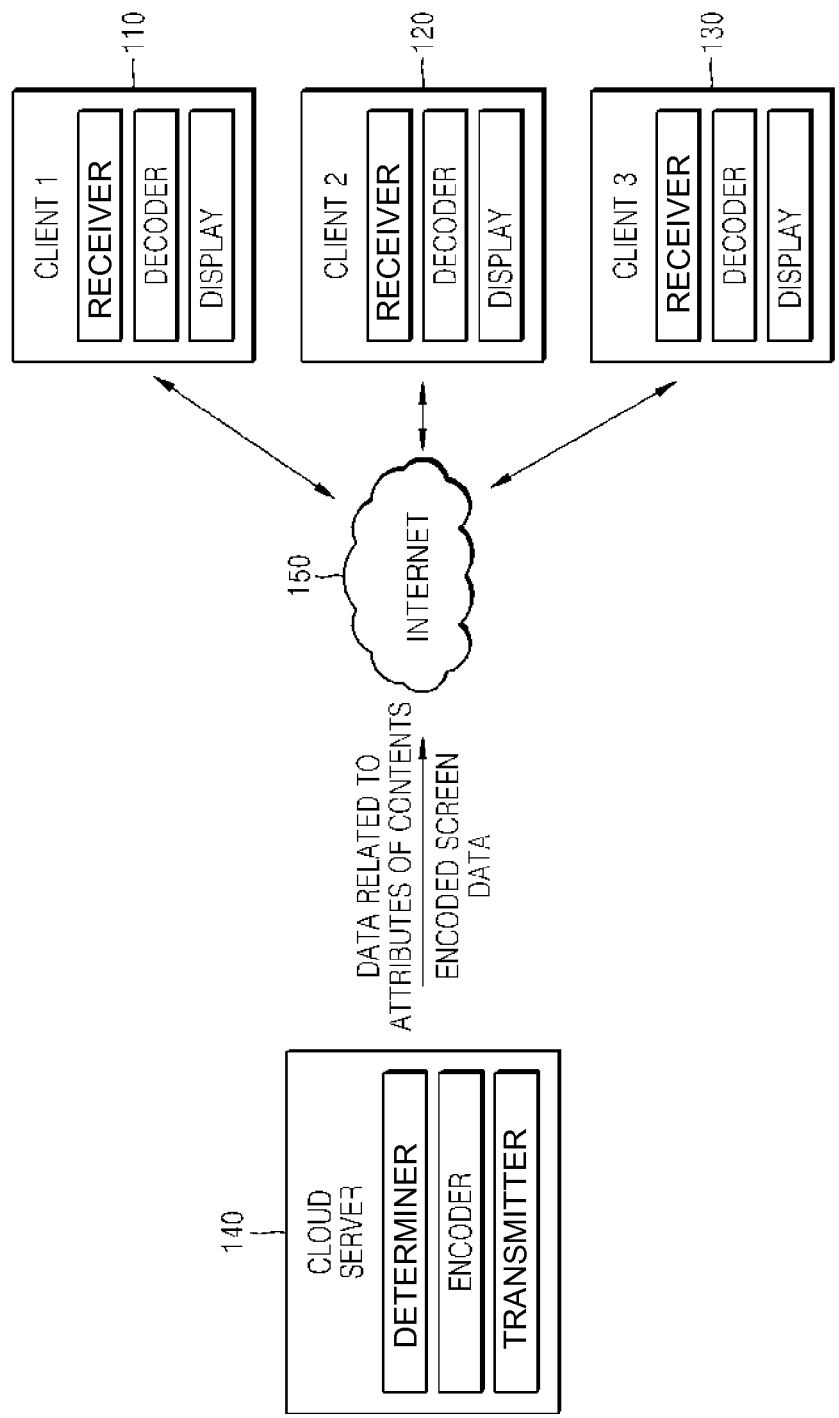
FIG. 2 is a diagram of an example of data exchange between a cloud server and a client via the Internet, according an exemplary embodiment.

FIG. 2 is a diagram of an example where the cloud server 140 and the clients 110 to 130 are connected via the Internet 150 and transmit and receive data to and from each other. An example of a configuration of the cloud server 140 and the clients 110 to 130 is illustrated using a block diagram.

The cloud server 140 may transmit data related to the attributes of the contents to the clients 110 to 130 through a network. Some examples of the attributes of the contents are a video, an image, graphics and text. The cloud server 140 may transmit the encoded screen data to the clients 110 to 130 through the Internet 150. The cloud server 140 may encode the screen data.

The cloud server 140 may transmit the encoded screen data to the clients 110 to 130 through the Internet 150.

The clients 110 to 130 may receive the screen data through the Internet 150.

The detailed operation of the cloud server 140 and the clients 110 to 130 will be described later.

Figure 3:
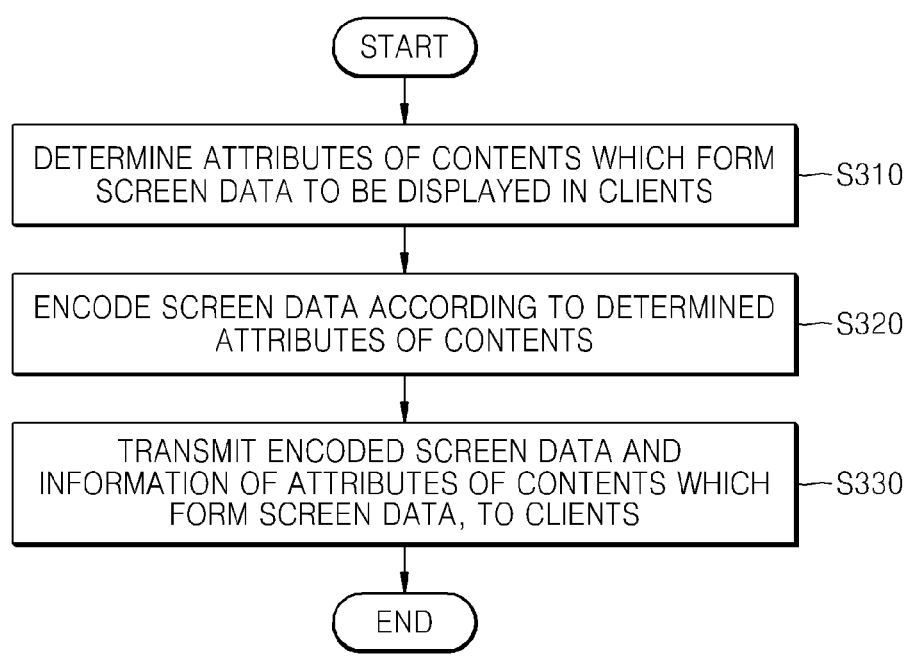
FIG. 3 is a flowchart of a method, performed by the cloud server, of providing screen data to a client, according to an exemplary embodiment.

FIG. 3 is a flowchart of a method, performed by the cloud server 140, of providing screen data to the clients 110 to 130, according to an exemplary embodiment.

In operation S310, the cloud server 140 may determine the attributes of the contents which form the screen data to be displayed in the clients 110 to 130. The cloud server 140 may determine whether the contents, which form the screen data, are video information, image information, graphic information, text information, or any other information.

In operation S320, the cloud server 140 may encode the screen data according to the attributes of the contents, which are determined in operation S310. The cloud server 140 may select one of a plurality of encoding methods based on the determined attributes of the contents. The method of selecting the encoding method will be described later, in detail with reference to FIGS. 4 and 5.

In operation S330, the cloud server 140 may transmit to clients 110 to 130 the screen data, which is encoded in operation S320. The data may be transmitted through the Internet 150.

Figure 4:
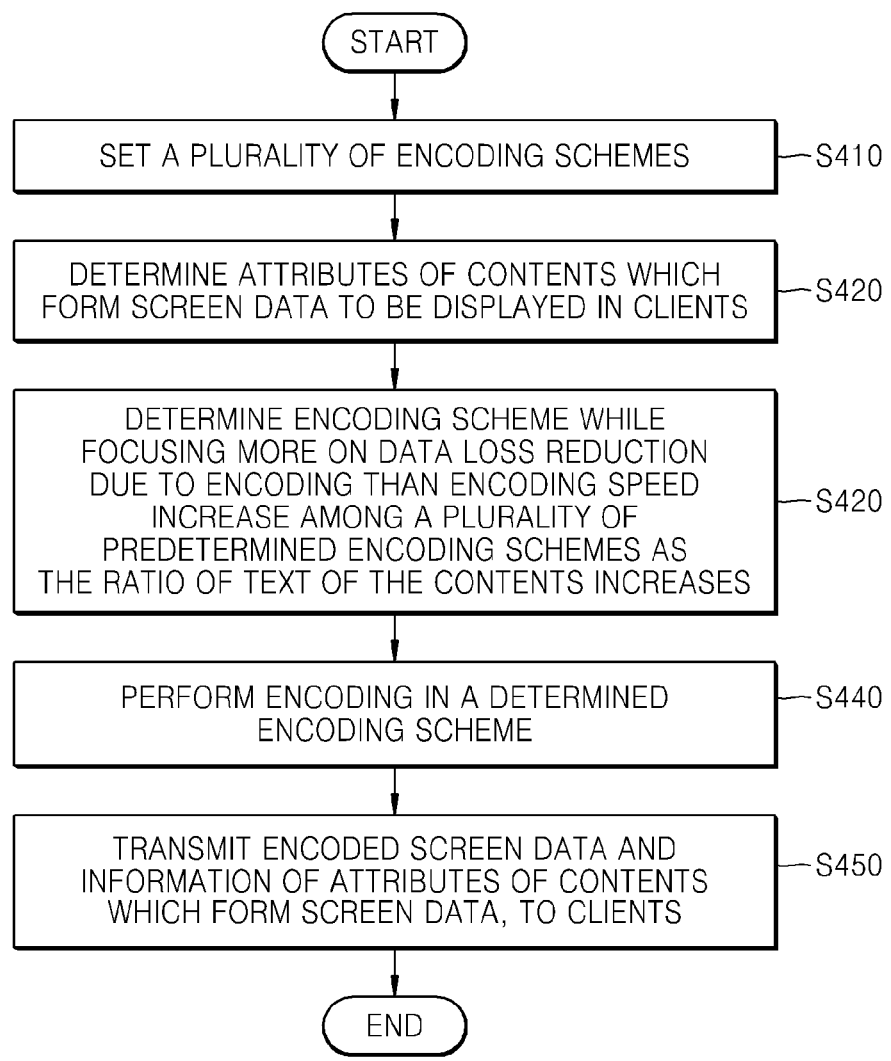
FIG. 4 is a flowchart of a method of performing encoding by a cloud server by determining an encoding method after determining attributes of contents which form screen data, according to an exemplary embodiment.

FIG. 4 is a flowchart directed to a method of performing encoding by a cloud server 140 by determining an encoding method after determining attributes of contents which form screen data, according to an exemplary embodiment.

In operation S410, the cloud server 140 may determine one or more encoding methods in advance. In particular, the cloud server 140 may determine in advance an optimal encoding method according to whether the contents, which form the screen data, are video information, image information, graphic information, text information or any other information. The cloud server 140 may determine, in advance, an optimal encoding method according to the portion of video information, image information, graphic information, text information or any other information, in the contents which form the screen data.

In operation S420, the cloud server 140 may determine the attributes of contents which form the screen data, to be displayed in the clients 110 to 130. In this operation, the cloud server 140 may determine the types of attributes of contents which form the screen data, and the ratio of each attribute. In particular, the attributes of the contents may include video, image, graphic, text and any other attributes.

Furthermore, when determining the attributes of the contents, the attributes of the contents may be determined using an API hooking scheme or a proprietary image processing scheme.

The API hooking scheme may be obtaining a controlling power by snatching Win32 API calls, but the meaning is not limited thereto.

The proprietary image processing may be a type of image processing scheme. That is, the cloud server 140 may determine the attributes of the contents by using a particular kind of image processing scheme.

In operation S430, the cloud server 140 may determine the method of encoding while focusing more on data loss reduction due to the encoding than on the encoding speed increase, from among a plurality of predetermined encoding methods, in response to there being a lot of texts, based on the result determined in operation S420. That is, the cloud server 140 may select the encoding method of a slow, but accurate scheme as the texts, which form the screen data among the contents, increase.

The cloud server 140 may more accurately encode texts with data which is less than the data required when encoding graphics or images. However, in response to the cloud server 140 failing to recognize text as text, but rather recognizes text as an image or a graphic and then performs encoding, much more data is required than when encoding the text as text, and accuracy may be low as a result.

Hence, when the ratio of the texts among the contents, which form the screen data, is high, the cloud server 140 may select the encoding scheme which is set to relatively focus on accurately processing the text information.

In operation S440, the cloud server 140 may perform encoding on the screen data in an encoding scheme which is determined in operation S430.

In operation S450, the cloud server 140 may transmit the screen data, which is encoded in operation S440, to the clients 110 to 130. The data may be transmitted through the Internet 150. Operation S450 may be similar to operation S330.

Figure 5:
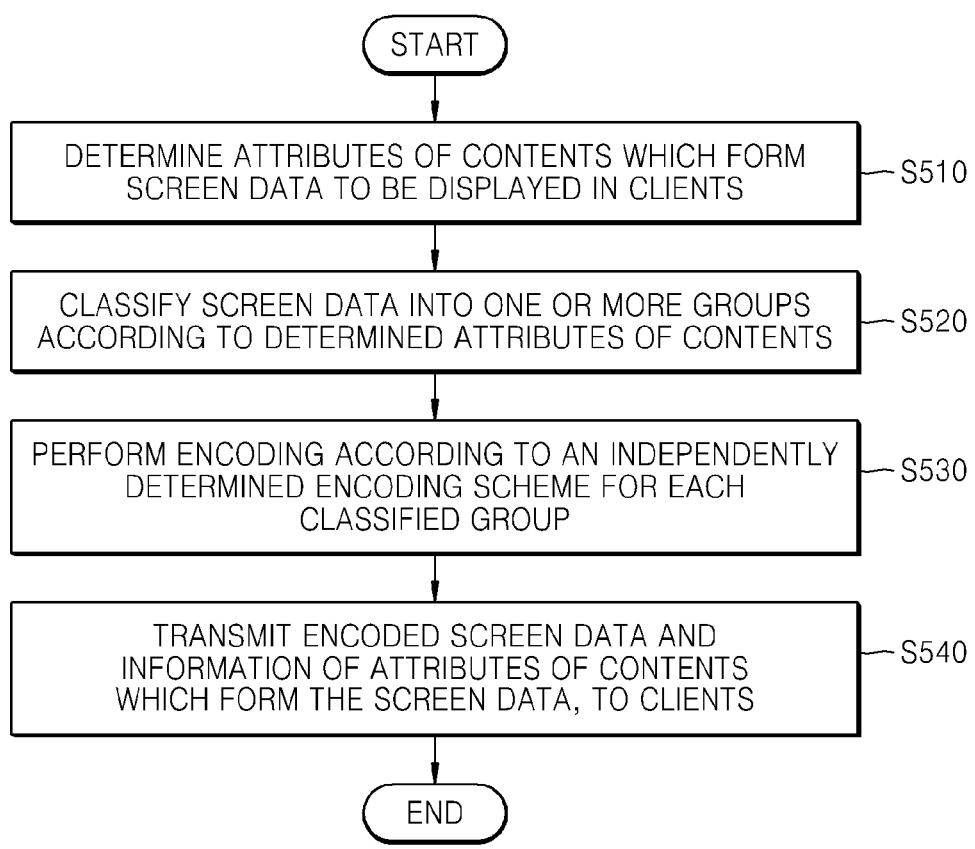
FIG. 5 is a flowchart of a method of performing encoding by a cloud server after classifying screen data into one or more groups, according to an exemplary embodiment.

FIG. 5 is a flowchart of a method of performing encoding, by a cloud server 140, after classifying screen data into one or more groups, according to an exemplary embodiment.

In operation S510, the cloud server 140 may determine the attributes of the contents which form the screen data to be displayed in the clients 110 to 130. Operation S510 may be similar to operation S310.

In operation S520, the cloud server 140 may classify the screen data into one or more groups according to the attributes of the contents which are determined in operation S510. Hence, one group may be formed by contents having the same attributes. The cloud server 140 may classify the screen data into one or more groups through an extraction. The cloud server 140 may classify the screen data into one or more groups according to the area setting. However, one group is not always formed of contents having the same attributes.

The classification by extraction may refer to only extracting the contents having certain attributes in the screen data. When the screen data is composed of a plurality of contents and not all contents have the same attributes, only the contents having certain attributes may be extracted from the screen data. The classification by extraction will be described later in detail with reference to FIG. 8.

Furthermore, classification by the area setting may be performed. The classification method according to the area setting may be more effective when the contents of certain attributes are gathered in a certain area. In response to a determination that the contents of certain attributes are gathered in a certain area, the cloud server 140 may classify the area as one group which is distinguished from other areas. The classification method according to the area setting will be described later, in detail, with reference to FIGS. 9 and 10.

In operation S530, the cloud server 140 may perform encoding according to the encoding scheme which is independently determined for each classified group. The encoding scheme for each group may be independently determined. The encoding scheme, which is determined for each group, may be different or may be the same. The encoding scheme, which is determined for each group, may be one of a plurality of predetermined encoding schemes.

The cloud server 140 may individually select the encoding scheme with or without loss, according to the attributes of the contents which form the screen data. Hence, the scheme of individually selecting the encoding scheme may reliably transmit the screen data while consuming a low bandwidth.

In operation S540, the cloud server 140 may transmit the screen data, which is encoded in operation S530, and the attribute information of the contents, which form the screen data, to the clients 110 to 130. The data may be transmitted through the Internet 150. The operation may be similar to operation S330.

Figure 6:
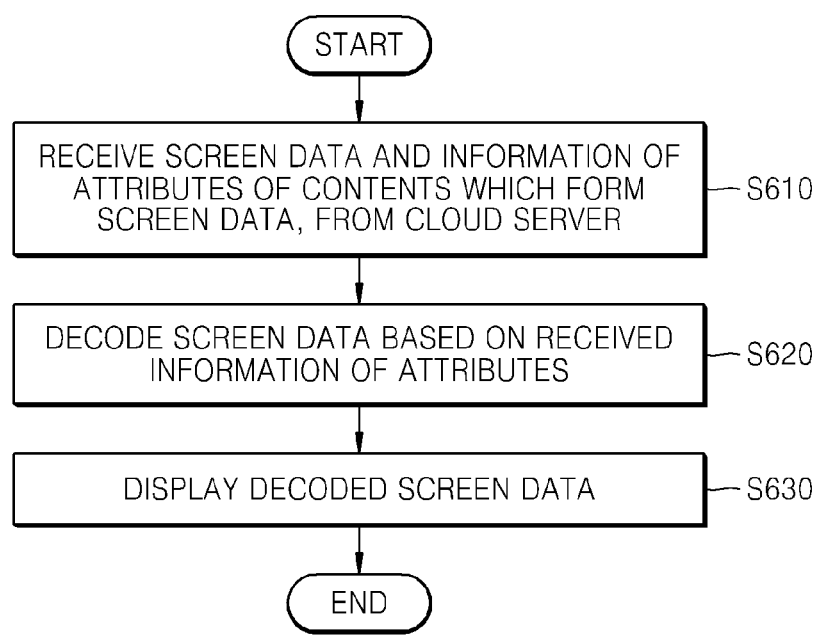
FIG. 6 is a flowchart of a method of displaying screen data by clients, according to an exemplary embodiment.

FIG. 6 is a flowchart of a method of displaying screen data, by clients 110 to 130, according to an exemplary embodiment.

In operation S610, the clients 110 to 130 may receive, from cloud server 140, the screen data and the information related to attributes of the contents which form the screen data. The cloud server 140 may encode the screen data and transmit the encoded screen data to clients 110 to 130. The cloud server 140 may transmit the information related to attributes of the contents, which form the screen data, as well as the encoded screen data. In addition, clients 110 to 130 may receive, from the cloud server 140, information related to attributes of the contents which form the screen data.

In operation S620, the clients 110 to 130 may decode the screen data based on the information related to attributes which are received from operation S910. Respectively encoded screen data may be decoded in the clients 110 to 130 in a decoding scheme which corresponds to respective encoding schemes, based on the scheme encoded in the cloud server 140.

In operation S630, the clients 110 to 130 may display the screen data which is decoded in operation S620.

Figure 7:
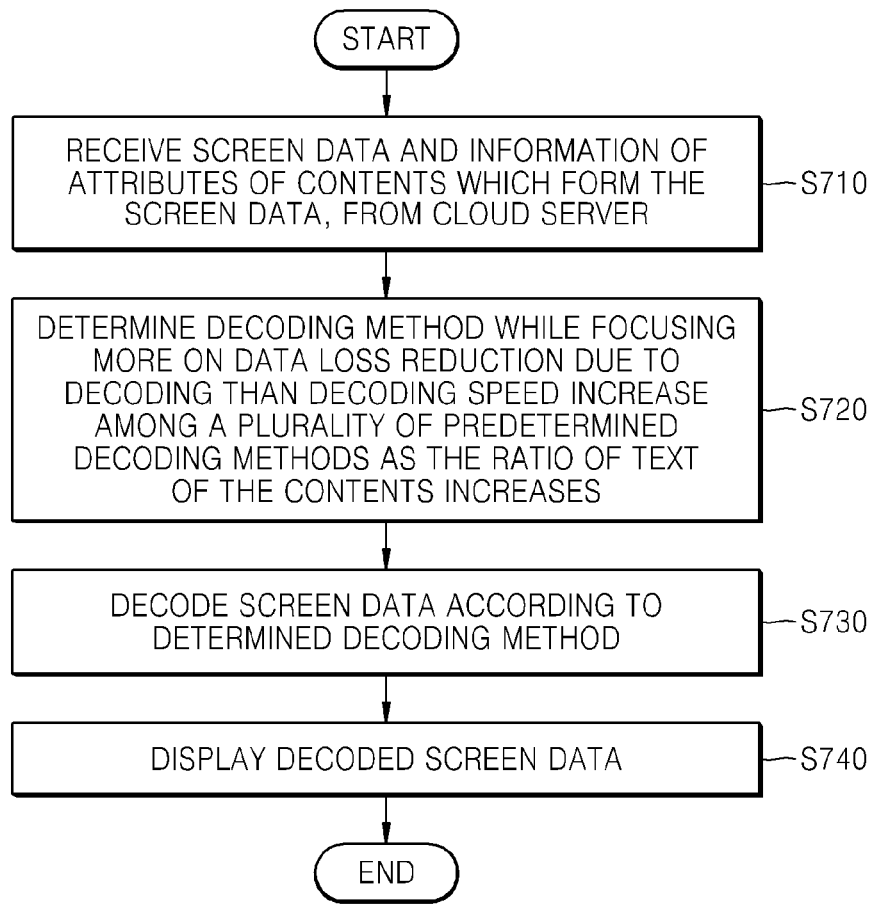
FIG. 7 is a flowchart of a method of displaying screen data by determining a decoding method based on information related to attributes which are received by clients, according to an exemplary embodiment.

FIG. 7 is a flowchart of a method of displaying screen data by determining a method of decoding based on information related to attributes which are received by clients 110 to 130, according to an exemplary embodiment.

In operation S710, the clients 110 to 130 may receive screen data and information related to attributes of contents, which form the screen data, from the cloud server 140. This operation may be similar to operation S610.

In operation 720, the clients 110 to 130 may determine the method of decoding while focusing more on data loss reduction due to the decoding than on the decoding speed increase, among a plurality of predetermined decoding methods, if there are a lot of texts, based on the information related to attributes of the contents which are received in operation S710. The clients 110 to 130 may determine the decoding method so that the decoding may be performed in an efficient manner by using the information related to attributes of the contents which form the screen data which is received from the cloud server 140.

In particular, as the ratio of texts, which form the screen data, from among the contents which form the screen data, increases, and clients 110 to 130 may perform decoding in a scheme that places priority on data loss reduction. In response to the text of the contents being recognized as text, accurate decoding may be performed quickly. Thus, as the ratio of the text increases in the contents, the clients 110 to 130 may accurately decode the text.

In operation S730, the clients 110 to 130 may decode the screen data according to the decoding scheme which is determined in operation S720.

In operation S740, the clients 110 to 130 may display the screen data which is decoded in operation S730.

FIG. 8 represents images of an example where some contents are extracted from screen data, according to an exemplary embodiment.

When the screen data is composed of images and texts, the texts may be extracted and classified.

The cloud server 140 may extract a text portion 820 from the screen data which is composed of images and texts. As such, the cloud server 140 may separate the text portion 820 of the screen data from an image portion 830. Likewise, the cloud server 140 may classify the screen data according to the attributes of the contents which form the screen data. Furthermore, such classifications may be performed by extraction.

When classification is made through extraction, the contents having the same attributes may be formed as one group. That is, when classification is performed through extraction, each group may be formed by only the contents having one attribute. However, the extraction may not be always perfectly performed.

The extraction may be performed in a manner that only extracts the contents having certain attributes. For example, with regard to the screen data 810 composed of the image 803 and the text 820, the text 820 and the image 830 may be respectively extracted and may be classified as different groups.

Figure 9:
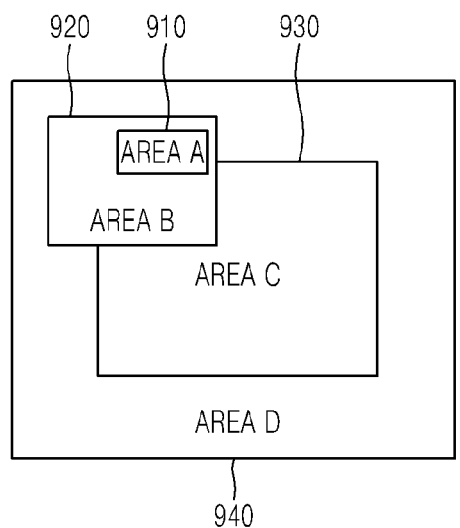
FIG. 9 is a diagram of an example where the area of screen data is divided, according to an exemplary embodiment.

FIG. 9 is a diagram of an example where the area of screen data is divided, according to an exemplary embodiment.

Screen data may be composed of a plurality of contents. Each content may contain different attributes, but is not limited thereto. Contents having certain attributes may be placed at a certain position on the screen. For example, the subtitles may be positioned on the lower central part of the screen. In this case, the contents having the text attributes may occupy a high ratio at the lower central part of the screen. Only the lower central part of the screen has graphics and images behind the subtitles as well as the subtitles. It may be seen that the ratio of the text contents is high at the lower central part of the screen.

When the contents of certain attributes are positioned at a certain area, the scheme of dividing the area into groups may be efficient.

When the ratio of the contents of certain attributes is high at a certain area, the area may be divided into groups.

In the case of a general web page portal screen, the area where text is displayed is generally distinguished from the area where an animation, etc. are displayed, and thus the area classification scheme may be more efficient than the classification by extraction.

Furthermore, in the classification according to the area division, an area may overlap or may not overlap. In particular, FIG. 9 illustrates an example when the area is duplicated.

Area A 910 is included in area B 920, and area B 920 may partly overlap with area C 930.

Likewise, the area division scheme, which allows duplication, may be efficient when a certain area is not composed of the contents of certain attributes, but rather a plurality of contents are mixed.

Figure 10:
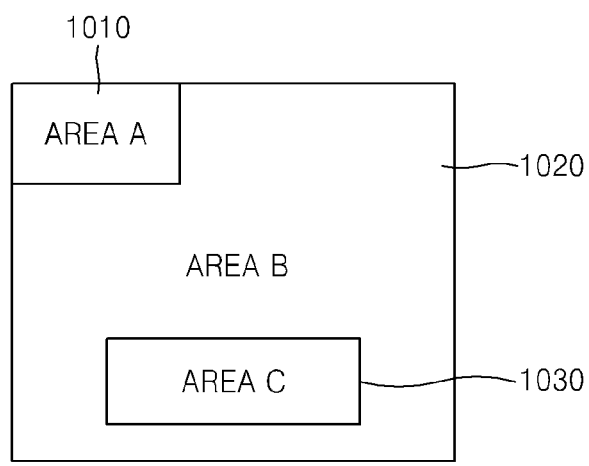
FIG. 10 is a diagram of an example where the area of screen data is divided without redundancy, according to an exemplary embodiment.

FIG. 10 is a diagram of an example where the area of screen data is divided without redundancy, according to an exemplary embodiment.

Area A 1010, area B 1020, and area C 1030 do not overlap each other. Furthermore, in the area division scheme without duplication, an area may be divided in a predetermined scheme or an area for division may be selected according to attributes of the screen data.

For example, when the subtitles are shown on the lower central part of the screen, an area C 1030 portion may be classified as one area. Area C 1030 may not be composed of only the text contents. However, the ratio of the text contents among the contents, which form area C 1030, may be high.

Whether or not the area division scheme allows the overlapping areas may be set in advance or may be changed according to the attributes of the screen data.

Figure 11:
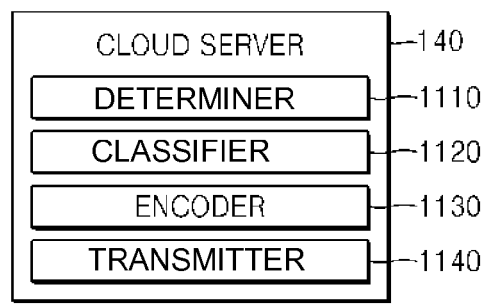
FIG. 11 is a block diagram of a cloud server according to an exemplary embodiment.

FIG. 11 is a block diagram of a cloud server 140 according to an exemplary embodiment.

The cloud server 140 may include one or more processing devices for performing one or more functions. The processing device may be a hardware circuit which substitutes a software command for performing a certain function or is used together with software.

A determiner 1110 may determine the attributes of contents which form the screen data to be displayed in the clients 110 to 130. In particular, when the screen data is composed of a plurality of contents, the determiner 1110 may distinguish each content and determine the attributes of each content.

The classifier 1120 may classify the screen data into one or more groups according to the attributes of the contents which are determined in the 1110. In particular, the classifier 1120 may divide the contents determiner having different attributes into different groups.

The classifier 1120 may use a plurality of data matrices to classify screen data according to the attributes of the contents.

The classifier 1120 may distinguish whether the contents, which form the screen data, are artificial data or natural data. Some examples of the natural data are a graphic, an image, and a video. An example of artificial data is text.

An encoder 1130 may perform encoding on the screen data according to the attributes of contents which form the screen data. At this time, the encoder 1130 may use a Codec to perform encoding and/or decoding.

The Codec may perform encoding with loss in the process of encoding data. However, when the data, on which the encoding with loss has been performed, is transmitted, less bandwidth may be consumed than in the case where the data, on which the encoding with loss has not been performed, is transmitted.

The Codec may perform the encoding without loss in the process of encoding the screen data. When the Codec performs encoding without loss, the reliability of the transmitted data may be enhanced.

The Codec may perform encoding in an encoding scheme with loss when contents such as graphics, images, and videos, and may perform encoding in an encoding scheme without loss when encoding contents such as texts.

The Codec may include a plurality of input and output channels to determine and separate the attributes of the contents which form the screen data.

In one or more exemplary embodiments, encoding and decoding may be performed on each content, according to the attributes of the contents.

One or more exemplary embodiments are related to the cloud server 140 and the clients 110 to 130 which display the screen data. Hence, a mobile device having a camera function of generating and sharing images may operate as the cloud server 140 or may operate as clients 110 to 130.

Figure 12:
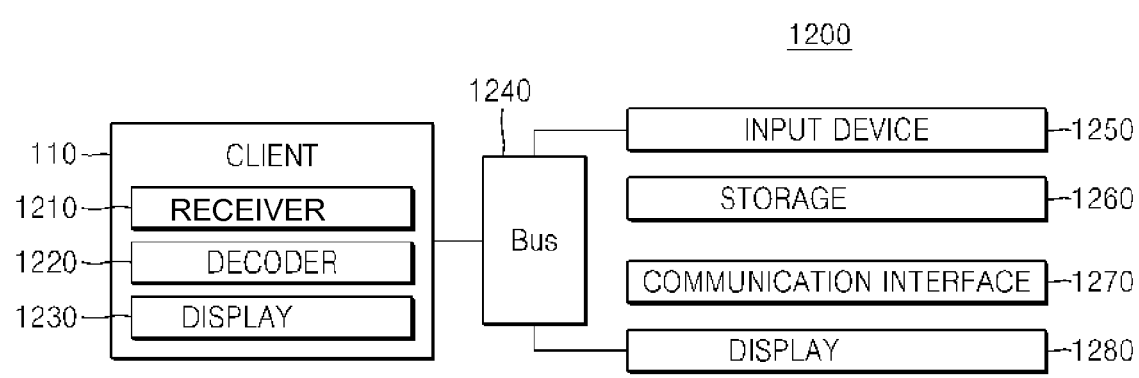
FIG. 12 is a block diagram of clients according to an exemplary embodiment.

FIG. 12 is a block diagram of clients 110 to 130 according to an exemplary embodiment.

The clients 110 to 130 may operate in a VDI environment.

Screen data may be generated by the cloud server 140.

A receiver 1210 may receive from the cloud server 140 screen data and information related to attributes of the contents, which form screen data. The reception may be performed through the Internet 150.

A decoder 1220 may decode the screen data based on the information related to attributes of the contents which form the screen data that is received in the receiver 1210.

The decoder 1220 may determine the method of decoding while focusing more on data loss reduction due to the decoding than on the decoding speed increase, from among a plurality of predetermined decoding methods, in response to there being a lot of texts, based on the information related to attributes of the contents which form the screen data which is received in the receiver 1210.

The display 1230 may display the screen data decoded in the decoder 1220.

A client device 1200 may include a bus 1240 or another communication unit to exchange information and performing communication.

The client 110 may be connected to the bus 1240 or another communicator for communication.

Furthermore, the client device 1200 may include a storage 1260. The storage device 1260 may include RAM or another dynamic storage. The storage device 1260 may store information or commands which are processed by the client 110, or may be connected to the bus 1240. The storage 1260 may store other intermediate information or temporary variables while commands are performed by the client 110. The storage 1260 may include a volatile storage such as RAM or a non-volatile device such as a ROM.

The client device 1200 may include a display 1280 such as a CRT display to display the screen data. The display 1280 may be connected to the bus 1240.

The client device 1200 may include an input device 1250 for allowing character inputs, number inputs, and other inputs. The input device 1250 may include a device for controlling a cursor movement such as a mouse and a device for inputting user-desired data, such as a keyboard.

The client device 1200 may include a communication interface 1270 connected to the bus 1240. The communication interface 1270 may include an ISDN modem or a modem which may provide a data communication connection which corresponds to a land line phone scheme. Furthermore, the communication interface 1270 may include a communicator which provides a data communication connection which is compatible with the LAN. The communication interface 1270 may be a data transmission and reception device which is related to data flow.

According to the method and apparatus for providing screen data of one or more exemplary embodiments, the screen data may be provided in a VDI and cloud computing environment, and a program for such may be recorded in a computer-readable recording medium.

The program may be recorded in a computer-readable recording medium and executed by a computer so that the above-described functions may be executed.

Likewise, in order to execute the method and apparatus for providing screen data, according to one or more exemplary embodiments, the above-described program may include codes which are coded in a computer language such as C, C++, JAVA, and a machine language.

Such codes may include functional codes related with functions which define the above-described functions, and may include control codes which are related to the execution procedure which is needed for the computer processor to execute the functions.

Furthermore, the codes may further include additional information which is needed when the computer processor executes the above-described functions, and codes related with the memory reference as to where the media needs to be referenced (address) in the internal or external memory of the computer.

Furthermore, when the computer processor needs to communicate with another computer or server in a remote place in order to execute the above-described functions, the codes may further include communication-related codes related to how the computer processor needs to communicate with another computer or server in a remote area using the communication module (e.g., a wired and/or wireless communication module) of the computer, which information or media need to be transmitted and received at the time of communication, etc.

The functional program for implementing the exemplary embodiments and the related codes and code segments may be easily inferred or changed by programmers of the technical field.

Some examples of the computer-readable recording medium having recorded the above-described program are ROM, RAM, a CD-ROM, a magnetic tape, a floppy disk, and an optical media storage device.

The computer-readable recording medium, having recorded the above-described program, may be distributed to a computer system which is connected by a network, and the computer-readable codes may be stored and executed in a distributed manner. In this case, at least one of a plurality of distributed computers may execute some of the above-described functions and transmit the result of execution to at least one of other distributed computers. The computer which receives the result may also execute some of the above-described functions and provide the result to other distributed computers.

In particular, a non-transitory computer-readable recording medium having recorded thereon an application, which is a program for executing a method and an apparatus for providing screen data, according to each exemplary embodiment, may be an application store server, a storage medium (e.g., a hard disk drive, etc.) included in an application provider server, or an application provider server itself.

A computer, which may read an application which is a program for executing a method and an apparatus for providing screen data according to each exemplary embodiment, may be a general personal computer (PC) such as a desktop computer and a notebook computer, a mobile terminal such as a smartphone, a tablet PC, a personal digital assistant (PDA), and a mobile communication terminal, or any other computing device which when programmed, becomes a special purpose computing device.

Furthermore, when a computer, which may read an application, which is a program for executing a method and apparatus for providing screen data, according to each exemplary embodiment, is a mobile terminal such as a smartphone, a tablet personal computer, a personal digital assistant (PDA), and a mobile communication terminal, the application may be downloaded from the application provider server to a PC and may be installed in a mobile terminal through a synchronization program.

Even if all components, which form an exemplary embodiment, have been described above to operate integrally, the exemplary embodiments are not limited thereto. That is, all components may be selectively integrated and operated within the scope of the purpose of the exemplary embodiments. Furthermore, all components may be respectively implemented as independent hardware, but some or all components may be implemented as a computer program having a program module which performs some or all functions which are combined in one or a plurality of hardware sets by selective combination. Codes and code segments which form the computer program may be easily inferred by those of ordinary skill in the art. Such a computer program may be stored in computer readable media to be read and executed by a computer to implement the exemplary embodiments. Some examples of the storage media of the computer program are a magnetic recording medium and an optical recording medium.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present invention as defined by the following claims.

What is claimed is:

1. A method of providing screen data to a client, through a cloud server, the method comprising:
   determining attributes of contents which form screen data to be displayed in the client;
   determining a method of encoding from among a plurality of predetermined encoding methods based on a result of the determined attributes of the contents, wherein the determined method of encoding is based more on data loss reduction due to encoding than on an encoding speed increase, as a ratio of the content of a predetermined attribute to the contents increases;

encoding the screen data according to the determined method of encoding; and transmitting to the client the encoded screen data and information related to the attributes of the contents which form the screen data.

2. The method of claim 1, wherein the content of the predetermined attribute comprises text.

3. The method of claim 1, wherein the determining of the attributes of the contents comprises:

determining the attributes of the contents using an Application Program Interface (API) hooking scheme or a proprietary image processing scheme.

4. The method of claim 1, further comprising:

classifying the screen data into one or more groups according to the determined attributes of the contents, wherein the encoding comprises:

performing the encoding according to an encoding method which is independently determined for each of the one or more groups.

5. The method of claim 4, wherein the classifying of the screen data into the one or more groups comprises:

classifying the screen data into one or more groups through extracting the contents based on the attributes of the contents which form the screen data.

6. The method of claim 4, wherein the classifying of the screen data into the one or more groups comprises:

classifying the screen data into one or more groups through dividing an area based on the attributes of the contents which form the screen data.

7. The method of claim 6, wherein the encoding comprises:

determining a method of encoding a group, which is classified through the area division, based on a ratio of attributes of contents which exist in the group when a plurality of content attributes exist within the group.

8. A method of displaying screen data to a client, the method comprising:

receiving from a cloud server screen data and information related to attributes of contents which form the screen data;

decoding the screen data based on the received information related to the attributes of the contents;

determining a method of decoding from among a plurality of predetermined decoding methods, based on the received information related to attributes of the contents, wherein the determined method of decoding is based more on data loss reduction due to decoding than on a decoding speed increase as a ratio of the content of a predetermined attribute to the contents increases; and displaying the decoded screen data.

9. The method of claim 8, wherein the content of the predetermined attribute comprises text.

10. A cloud server for providing screen data to a client, the cloud server comprising:

a determiner configured to determine attributes related to contents which form screen data to be displayed in the client;

an encoder configured to encode the screen data according to the determined attributes related to the contents; and a transmitter configured to transmit to the client the encoded screen data and information related to the attributes of the contents which form the screen data, wherein the encoder is configured to determine a method of encoding from among a plurality of predetermined encoding methods in an encoder determination, wherein the encoder determination is based more on data loss reduction due to encoding than on an encoding speed increase as a ratio of the content of a predetermined attribute to the contents increases, as a result of the determination of the determiner.

11. The cloud server of claim 10, wherein the content of the predetermined attribute comprises text.

12. The cloud server of claim 10, wherein the determiner is configured to determine the attributes of the contents using an Application Programming Interface (API) hooking scheme or a proprietary image processing scheme.

13. The cloud server of claim 10, further comprising:

a classifier configured to classify the screen data into one or more groups according to the determined attributes of the contents, wherein the encoder is configured to perform the encoding according to an encoding method which is independently determined for each of the one or more groups.

14. The cloud server of claim 13, wherein the classifier is configured to classify the screen data into the one or more groups through extracting the contents based on the attributes of the contents which form the screen data.

15. The cloud server of claim 13, wherein the classifier is configured to classify the screen data into the one or more groups through dividing an area based on the attributes of the contents which form the screen data.

16. The cloud server of claim 15, wherein the encoder is configured to determine a method of determining a group, which is classified through the area division, based on a ratio of attributes of contents which exist in the group when a plurality of content attributes exist within the group.

17. A client for displaying screen data generated by a cloud server, the client comprising:

a receiver configured to receive from the cloud server screen data and information related to attributes of contents which form the screen data;

a decoder configured to decode the screen data based on the received information related to attributes of contents; and a display configured to display the decoded screen data, wherein the decoder is configured to determine a method of decoding from among a plurality of predetermined decoding methods based on the received information related to attributes of the contents, wherein the determined method of decoding is based more on data loss reduction due to decoding than on a decoding speed increase as a ratio of the content of a predetermined attribute to the contents increases.

18. The client of claim 17, wherein the content of the predetermined attribute comprises text.

19. A non-transitory computer-readable recording medium having recorded therein as a data structure, a program for executing a method, wherein the computer, when executing the method, executes the method of claim 1.

20. A cloud server for providing screen data to a client, the cloud server comprising:

a determiner configured to determine attributes related to contents which form screen data to be displayed in the client;

a classifier configured to classify the screen data into one or more groups according to the attributes of the contents which are determined by the determiner; and an encoder configured to encode the screen data according to the determined attributes related to the contents, wherein the encoder is configured to determine a method of encoding from among a plurality of predetermined encoding methods while focusing more on data loss reduction due to encoding than on an encoding speed increase as a ratio of the content of a predetermined attribute to the contents increases, as a result of the determination of the determiner.

21. The cloud server according to claim 20, further comprising a transmitter configured to transmit to the client the encoded screen data and information related to the attributes of the contents which form the screen data.

22. The cloud server of claim 20, wherein the content of the predetermined attribute comprises text.

23. The cloud server of claim 20, wherein the determiner is configured to determine the attributes of the contents using an Application Program Interface (API) hooking scheme or a proprietary image processing scheme.

24. The cloud server of claim 20, further comprising:
a classifier configured to classify the screen data into one or more groups according to the determined attributes of the contents,
wherein the encoder is configured to perform the encoding according to an encoding method which is independently determined for each group.

* * * * *